United States Patent
Busch et al.

(10) Patent No.: US 9,552,932 B2
(45) Date of Patent: Jan. 24, 2017

(54) HIGHLY POROUS SEPARATOR FOIL

(71) Applicant: Treofan Germany GmbH & Co. KG, Neunkirchen (DE)

(72) Inventors: Detlef Busch, Saarlouis (DE); Bertram Schmitz, Sarreguemines (FR); Dominic Klein, Bexbach (DE)

(73) Assignee: Treofan Germany GmbH & Co. KG (DE)

( * ) Notice: Subject to any disclaimer, the term of this patent is extended or adjusted under 35 U.S.C. 154(b) by 0 days.

(21) Appl. No.: 14/511,323

(22) Filed: Oct. 10, 2014

(65) Prior Publication Data

US 2015/0085426 A1   Mar. 26, 2015

Related U.S. Application Data

(62) Division of application No. 13/643,410, filed as application No. PCT/EP2011/002028 on Apr. 20, 2011, now Pat. No. 8,889,284.

(30) Foreign Application Priority Data

Apr. 26, 2010   (DE) .................. 10 2010 018 374

(51) Int. Cl.

| | |
|---|---|
| *H01G 11/52* | (2013.01) |
| *B29C 55/00* | (2006.01) |
| *B29C 55/14* | (2006.01) |
| *C08J 5/18* | (2006.01) |
| *C08K 5/098* | (2006.01) |
| *C08L 23/12* | (2006.01) |
| *H01G 9/02* | (2006.01) |
| *H01G 9/00* | (2006.01) |
| *H01M 2/16* | (2006.01) |
| *B29D 7/01* | (2006.01) |
| *C08K 3/22* | (2006.01) |
| *B29K 23/00* | (2006.01) |
| *B29K 105/04* | (2006.01) |
| *B29K 105/16* | (2006.01) |
| *H01M 2/14* | (2006.01) |
| *H01M 10/052* | (2010.01) |

(52) U.S. Cl.
CPC ............ *H01G 11/52* (2013.01); *B29C 55/005* (2013.01); *B29C 55/143* (2013.01); *B29D 7/01* (2013.01); *C08J 5/18* (2013.01); *C08K 3/22* (2013.01); *C08K 5/098* (2013.01); *C08L 23/12* (2013.01); *H01G 9/02* (2013.01); *H01G 9/155* (2013.01); *H01M 2/1653* (2013.01); *H01M 2/1686* (2013.01); *B29K 2023/12* (2013.01); *B29K 2105/04* (2013.01); *B29K 2105/041* (2013.01); *B29K 2105/16* (2013.01); *B29K 2995/0053* (2013.01); *C08J 2323/10* (2013.01); *C08K 2003/2265* (2013.01); *C08L 2203/16* (2013.01); *C08L 2205/24* (2013.01); *C08L 2205/242* (2013.01); *H01M 2/145* (2013.01); *H01M 10/052* (2013.01); *Y02E 60/12* (2013.01); *Y02E 60/13* (2013.01); *Y10T 428/249953* (2015.04); *Y10T 428/249981* (2015.04)

(58) Field of Classification Search
None
See application file for complete search history.

(56) References Cited

U.S. PATENT DOCUMENTS

| | | | |
|---|---|---|---|
| 5,231,126 A | 7/1993 | Shi et al. | |
| 7,235,203 B2 | 6/2007 | Sadamitsu et al. | |
| 2005/0182175 A1 | 8/2005 | Busch et al. | |
| 2010/0047544 A1* | 2/2010 | Busch .................. | C08J 5/18 428/220 |
| 2011/0064934 A1 | 3/2011 | Peters et al. | |
| 2011/0244306 A1 | 10/2011 | Schmitz et al. | |
| 2011/0244336 A1 | 10/2011 | Schmitz et al. | |
| 2012/0171548 A1 | 7/2012 | Busch et al. | |

FOREIGN PATENT DOCUMENTS

| | | |
|---|---|---|
| DE | 3610644 A1 | 10/1986 |
| DE | 4420989 B4 | 4/2005 |
| EP | 0557721 B1 | 10/2000 |
| EP | 1757653 B1 | 1/2011 |
| WO | WO-03/094832 A3 | 7/2004 |
| WO | WO2008/025796 * | 3/2008 |
| WO | WO-2009132803 A3 | 12/2009 |
| WO | WO-2010066389 A1 | 6/2010 |
| WO | WO-2010066390 A1 | 6/2010 |
| WO | WO-2010145770 A1 | 12/2010 |
| WO | WO-2011076375 A3 | 10/2011 |

OTHER PUBLICATIONS

English language translation for International Preliminary Report on Patentability for PCT/EP2011/002028.
International Preliminary Report on Patentability from PCT/EP2011/002028 dated Oct. 30, 2012.
International Search Report from PCT/EP2011/002028 mailed Aug. 3, 2011.

* cited by examiner

*Primary Examiner* — Sarah A Slifka
(74) *Attorney, Agent, or Firm* — Drinker Biddle & Reath LLP

(57) ABSTRACT

The invention relates to a biaxially oriented single- or multilayer porous foil, the porosity of which is generated by transformation of ss-crystalline polypropylene during orientation of the foil. The Gurley value of the foil is <250 s. The invention also relates to a process for producing the foil by using a low transverse stretching velocity for the transverse orientation process.

17 Claims, No Drawings

HIGHLY POROUS SEPARATOR FOIL

CROSS-REFERENCE TO RELATED APPLICATIONS

This application is a divisional application of U.S. application Ser. No. 13/643,410 filed Oct. 25, 2012, now issued U.S. Pat. No. 8,889,284, which is incorporated by reference in its entirety. Application Ser. No. 13/643,410 is a national stage application (under 35 U.S.C. §371) of PCT/EP2011/002028, filed Apr. 20, 2011, which claims benefit of German application 10 2010 018 374.1, filed Apr. 26, 2010

The present invention relates to a porous foil and use thereof as a separator, and a method for producing the foil.

Modern devices require an energy source, such as batteries or rechargeable batteries, which enable them to be used regardless of location. Batteries have the disadvantage that they must be disposed of. Therefore, increased used is being made of rechargeable batteries (secondary batteries), which can be recharged with the aid of chargers connected to the electricity mains. If used properly, nickel-cadmium rechargeable batteries (NiCd rechargeable batteries) for example can have a service life of about 1000 charge cycles.

Batteries and rechargeable batteries always include two electrodes that are dipped into an electrolyte solution, and a separator, which separates the anode and the cathode. The various rechargeable battery types differ according to the electrode material used, the electrolyte, and the separator used. The task of a battery separator is to ensure that there is always a distance between the cathode and the anode in batteries, of between the negative and the positive electrode in rechargeable batteries. The separator must be a barrier that isolates the two electrodes from one another electrically in order to prevent internal short circuits. At the same time, the separator must be permeable for ions so that the electrochemical reactions can take place in the cell.

Electrochemical double-layer capacitors (DLC) are also becoming increasingly important as supplementary energy sources that fill the gap between conventional batteries or rechargeable batteries and capacitors. Since they are capable of quickly taking up large quantities of electrical power and making the power available for a short time, they can support an existing energy source or provide supplementary energy for an existing generator, or bridge a short-term power failure until an emergency unit can be started after a time lag.

The construction and manufacture of DLCs are comparable to the construction and manufacture of lithium-ion batteries. An electrochemical double-layer capacitor essentially comprises two electrodes that are immersed in an electrolyte solution and are separated by the separator. This separator must be porous and absorb the electrolyte. At the same time, it must be permeable for the electrolyte, particularly for the ions that are formed by dissociation of the conductive salt dissolved in the electrolyte. Therefore, porous materials such as paper are selected for use as separators. However, separators made from other materials, such as plastic films, felts or fabrics made from plastic or glass fibres are also possible.

In order to increase capacitance, it is common to place multiple electrodes and separators one on top of the other in alternating stacks, for example as a planar stack, or in an even simpler and more compact manner still, in the form of a winding. The size of the gap between the two electrodes is determined by the thickness of the separator, and possibly by any insulating materials present. To ensure that the electrolyte/separator combination contributes as little as possible to the internal resistance, the separator should be thin and highly porous, because porosity affects electrical resistance by approximately a magnitude of two. The separator should also be sufficiently stable in the given electrolyte. Glass fibre fleeces or papers satisfy the requirements well, particularly regarding high porosity.

In order to improve the internal resistance, the thickness of the separator may be reduced, or its porosity may be increased. Under certain circumstances, increasing the porosity may be more effective than reducing the separator thickness. This optimisation by providing high porosities and low thicknesses is limited by the mechanical stability of the separators, since the separator may easily be perforated, particularly if electrode surfaces are rough, granular or fibrous. Separators in which mechanical stability has only been optimized in one direction, for example monoaxially stretched foils, are particularly susceptible to excessive splitting in the longitudinal direction. For biaxially oriented foils too, a high degree of orientation is often introduced even during longitudinal stretching in order to increase their porosity. For example, according to U.S. Pat. No. 7,235,203 discloses that high orientation of the β-crystallites after longitudinal stretching is favourable for obtaining high porosity. However, these porous foils do not display adequate stability in the transverse direction.

There is therefore a need to improve the mechanical stability, particularly the tendency to split in the in the longitudinal direction, of foils that have high porosity and low thickness.

Various processes are known according to which polyolefin foils having high porosities may be produced: bulking agent processes; cold drawing, extraction processes and β-crystallite processes. These processes differ fundamentally in respect of the various mechanisms by which the pores are created.

For example porous foils can be produced by the addition of very large quantities of bulking agents. The pores are created during stretching due to the incompatibility between the bulking agents and the polymer matrix. However, despite extreme stretching the mechanical strength of the foil is deteriorated considerably by the large quantities of bulking agents required to achieve high porosities, up to 40% by weight, and these products are not usable as separators in a DLC.

In the "extraction processes" the pores are created in principle by eluting a component out of the polymer matrix using suitable solvents. Many different variants of these processes have been developed, and these differ according to the nature of the additives and the suitable solvents. Both organic and inorganic additives may be extracted. This extraction may be carried out as the last process step in the production of the foil, or it may be combines with a subsequent stretching step.

An older but successful method is based on stretching the polymer matrix at very low temperatures (cold drawing). For this, the foil is first extruded, and then tempered for several hours to increase its crystalline fraction. In the next process step, the foil is cold drawn in the longitudinal direction at very low temperatures to create multiple flaws in the form of very tiny micro-cracks. This prestretched foil with flaws is then stretched in the same direction again but with larger factors and at elevated temperatures, so that the flaws are enlarged to form pores that create a network-like structure. These foils exhibit both high porosities and good mechanical strength in the direction in which they are stretched, which is generally the longitudinal direction. However, mechanical strength in the transverse direction is still inadequate, and as a consequence their resistance to perforation is poor, so they remain extremely susceptible to lengthwise splitting. Overall, the process is also expensive.

Another known method for manufacturing porous foils is based on mixing β-nucleating agents with polypropylene. Due to the β-nucleating agent, the polypropylene forms high concentrations of "β-crystallites" as the melt cools. During the subsequent longitudinal stretching, the β-phase is transformed into the alpha-modification of the polypropylene. Since these different crystal forms have different densities, in this case too, a large number of microscopic flaws are formed initially, and these are enlarged into pores by stretching. The foils that are manufactured according to this method have good porosities and good mechanical strengths in the longitudinal and the transverse direction, and are very economical. In the following, these foils will also be referred to as β-porous foils. However, it is not possible to manufacture high-porosity foils with very low Gurley values by means of this process. In order to improve the porosity, greater orientation in the longitudinal direction may be introduced before the transverse stretching. However, this also increases the tendency to split in the longitudinal direction, which in turn means again that the mechanical properties are not good enough to satisfy the stringent requirements.

Such foils with high porosity of under 500 s/100 ml and the porosity of which is improved by the application of substantial orientation in the longitudinal direction are described for example in U.S. Pat. No. 7,235,203. According to this teaching, the orientation in the longitudinal direction is increased if a very high neck-in ratio from 25 to 50% is permitted during stretching (in the longitudinal direction). As an alternative, a second method is described according to which needle-like crystals are used as the β-nucleating agents. Due to these needle-like crystals, the β-crystallites begin to form predominantly orientated in the longitudinal direction as early as when the melt begins to cool to form the pre-film. These longitudinally orientated crystals help to increase the orientation, so that there is a particularly pronounced longitudinal orientation after longitudinal stretching. These two methods may also be combined, so that a longitudinally stretched foil with extremely high longitudinal orientation is obtained either by the neck-in ratio or the use of needle-like crystallites or via both methods together. After the subsequent transverse stretching of this foil with high longitudinal orientation, very high porosities are achieved. However, the high longitudinal orientation still results in a strong tendency to split longitudinally despite the final transverse stretching step. This tendency to split impairs the running reliability of the foil during transverse stretching as well as the intended processing to form a separator.

The object of the present invention was therefore to provide a porous foil that has high porosity and permeability, and which is improved with regard to mechanical strength, particularly with regard to its tendency to split longitudinally, and is thus usable in small thicknesses as a separator in an extremely wide range of applications.

The object underlying the invention is thus solved with a biaxially oriented single- or multilayered porous foil, the porosity of which is generated by transformation of β-crystalline polypropylene during stretching of the foil, which comprises at least one porous layer, which layer contains at least one propylene polymer and β-nucleating agents, wherein the foil has a Gurley value of <250 s.

Surprisingly, it is possible to create a porous foil from polypropylene and β-nucleating agents that has very high porosity and high permeability of <250 s, and which at the same time is distinguished by very satisfactorily low tendency to split, and is thus particularly suitable for use as a separator in a double layer capacitor (DLC). The Gurley value of the foil according to the invention is generally in a range of <200 s, preferably 50 to 180 s, particularly 80 to 150 s.

In the course of the work related to the present invention, it was found that it is possible to transversely orient a foil with a moderate longitudinal orientation after longitudinal stretching in such manner that a high porosity and very high permeability is achieved, and the tendency thereof to split longitudinally is reduced. In this context, it is essential for the purposes of the invention to carry out this transverse stretching at a very low stretching velocity, preferably less than 40%/s.

The object underlying the invention is thus also solved by a process for producing a single-layer or multi-layer porous polypropylene foil in which propylene polymer and β-nucleating agents are melted in an extruder and extruded through a flat nozzle onto a take-off roller, on which the melt film cools down and solidifies, forming β-crystallites, and this foil is then stretched longitudinally and afterwards transversely, wherein the stretching operation during transverse stretching is carried out at a low stretching speed of less than 40%/sec.

The object underlying the invention is further solved by a process for producing a single-layer or multi-layer porous polypropylene foil in which in a first longitudinal stretching process propylene polymer and β-nucleating agents are melted in an extruder and extruded through a flat nozzle onto a take-off roller, on which the melt film cools down and solidifies, forming β-crystallites, and this foil is then stretched longitudinally, cooled and wound up, and in a second, transverse stretching process, this longitudinally stretched, wound up foil is unwound, heated to a transverse stretching temperature and stretched in the transverse direction, wherein the advance speed of the longitudinal stretching process is greater or less than the advance speed of the transverse stretching process.

The dependent claims describe preferred embodiments of the foil according to the invention or of the methods according to the invention.

The foil according to the invention comprises at least one porous layer that is constructed from propylene polymers, preferably propylene homopolymers and/or propylene block copolymers, and contains β-nucleating agents. Optionally, other polyolefins may also be present in small quantities, provided they do not negatively affect the porosity or other essential properties. The microporous layer may also contain standard additives, such as stabilizers and/or neutralizing agents in the effective quantities for the respective substances.

Suitable propylene homopolymers contain 98 to 100% by weight, preferably 99 to 100% by weight propylene units and have a melting point (DLC) of 150° C. or higher, preferably 155 to 170° C., and generally a melt flow index from 0.5 to 10 g/10 min, preferably 2 to 8 g/10 min, at 230° C. and a force of 2.16 kg (DIN 53735). Isotactic propylene homopolymers having an n-heptane soluble fraction less than 15% by weight, preferably 1 to 10% by weight, represent preferred propylene homopolymers for the layer. Isotactic propylene homopolymers with high chain isotacticity of at least 96%, preferably 97-99% ($^{13}$C-NMR; triad method) may also be used for preference. These raw materials are known in the related art as HIPP (High Isotactic Polypropylene) or HCPP (High Crystalline Polypropylene)

polymers and are distinguished by the high stereoregularity of the polymer chains, higher crystallinity and a higher melting point (compared with propylene polymers that have $^{13}$C-NMR isotacticity from 90 to <96%, and which are also usable).

Propylene block copolymers have a melting point from above 140 to 170° C., preferably from 145 to 165° C., particularly 150 to 160° C. and a melting range that begins at over 120° C., preferably in a range from 125-140° C. The content of comonomer, preferably ethylene, is for example preferably between 1 and 20% by weight, preferably between 1 and 10% by weight. The melt flow index of the propylene block copolymers is generally in a range from 1 to 20 g/10 min, preferably 1 to 10 g/10 min.

The porous layer may optionally also include other additional polyolefins, provided they do not impair the properties, particularly porosity and mechanical strengths. Other polyolefins are for example statistical copolymers of ethylene and propylene having an ethylene content of 20% by weight or less, statistical copolymers of propylene with $C_4$-$C_8$ olefins having an olefin content of 20% by weight or less, terpolymers of propylene, ethylene and butylenes having an ethylene content of 10% by weight or less and with a butylenes content of 15% by weight or less, or polyethylenes, such as LDPE, VLDPE and LLDPE.

In a preferred embodiment, the porous layer is made only from propylene homopolymer and/or propylene block copolymer and β-nucleating agent, and optionally including a stabilizer and neutralizing agent.

In general, all known additives that promote the formation of β-crystals in polypropylene as a polypropylene melt is cooling as suitable for use as β-nucleating agents for the porous layer. Such β-nucleating agents, and the mode of action thereof in a polypropylene matrix, are known on their own merits in the related art and will be described in detail in the following.

The nucleating agent can be a calcium salt of pimelic acid and/or of suberic acid or a nanoscale iron oxide.

Various crystalline phases of polypropylene are known. When a melt cools, the formation of α-crystalline PP usually predominates, with a melting point in the range from 155-170° C., preferably 158-162° C. If a certain temperature management schedule is applied as the melt cools, a small fraction of a β-crystalline phase may be generated, which with 145-152° C., preferably 148-150° C., has a significantly lower melting point than the monoclinic α-modification. Additives are known in the related art that result in an elevated fraction of the β-modification when polypropylene cools, for example γ-quinacridones, dihydroquinacridines or calcium salts of phthalic acid.

For the purposes of the present invention, strongly active β-nucleating agents that produce a β-fraction from 40-95%, preferably from 50-85% (DSC) when a propylene homopolymer melt cools are used for preference. The β-fraction is determined from the DSC of the cooled propylene homopolymer melt. For example, a two-component β-nucleating system of calcium carbonate and organic dicarboxylic acids such as is described in DE 3610644 and is herewith explicitly included by reference is preferred. Calcium salts of dicarboxylic acids such as calcium pimelate or calcium suberate, such as are described in DE 4420989 and which are also included explicitly by reference, are particularly advantageous. The dicarboxamides, particularly N,N-dicyclohexyl-2,6-naphthalene dicarboxamide, described in EP 0557721 are also suitable β-nucleating agents.

Nucleating agents used preferably do not include substances that form needle-shaped crystals, in order to avoid further increasing the longitudinal orientation.

Besides the β-nucleating agents, it is also important to maintain a specific temperature range and dwell times at these temperatures as the unstretched melt film is cooling in order to obtain a high fraction of β-crystalline polypropylene. The melt film is preferably cooled at a temperature between 60 and 140° C., particularly 80 and 130° C., for example 85 and 125 or 120° C. Slow cooling also favours the growth of β-crystallites, so the drawing off speed, that is to say the speed at which the melt film passes over the first cooling roller, should be slow to ensure that the necessary dwell times at the selected temperatures are long enough. The drawing off speed is preferably slower than 25 m/min, particularly 1 to 20 m/min. The dwell time is generally 20 to 300 s; preferably 30 to 200 s.

The porous layer generally contains 45 to <100% by weight, preferably 50 to 95% by weight, propylene homopolymers and/or propylene block copolymer and 0.001 to 5% by weight, preferably 50-10,000 ppm of at least one β-nucleating agent relative to the weight of the porous layer. If other polyolefins are also included in the layer, the fraction of propylene homopolymer or of the block copolymer is reduced correspondingly. In general, the quantity of additional polymers in the layer will be 0 to <10% by weight, preferably 0 to 5% by weight, particularly 0.5 to 2% by weight if such are included additionally. Said propylene homopolymer or propylene block copolymer fraction is also reduced in the same way if larger quantities of up to 5% by weight nucleating agent are used. The layer may also contain usual stabilizers and neutralizing agents as well as other additives in the usual low quantities of less than 2% by weight.

In a preferred embodiment, the porous layer is constructed from a mixture of propylene homopolymer and propylene block copolymer. In these embodiments, the porous layer generally contains 50 to 85% by weight, preferably 60 to 75% by weight, propylene homopolymers and 15 to 50% by weight propylene block copolymers, preferably 25 to 40% by weight, and 0.001 to 5% by weight, preferably 50 to 10,000 ppm of at least one β-nucleating agent, relative to the weight of the layer, and optionally the additives mentioned previously such as stabilizers and neutralizing agents. In this case too, other polyolefins may also be contained in a quantity from 0 to <10% by weight, preferably 0 to 5% by weight, particularly 0.5 to 2% by weight, and the fraction of the propylene homopolymer or block copolymer is then reduced correspondingly.

Particularly preferred embodiments of the porous foil according to the invention contain 50 to 10,000 ppm, preferably 50 to 5,000 ppm, particularly 50 to 2,000 ppm calcium pimelate or calcium suberate as the β-nucleating agent in the porous layer.

The porous foil may be made up of a single layer or multiple layers. The thickness of the foil is generally in a range from 10 to 100 μm, preferably 15 to 60 μm, for example 15 to 40 μm. The surface of the porous foil may be subjected to a corona, flame or plasma treatment process to improve filling with electrolyte.

In a multilayer embodiment, the foil includes other porous layers that are constructed as described in the preceding, wherein the composition of the various porous layers does not necessarily have to be identical. For multilayer embodiments, the thickness of the individual layers is generally in the range from 2 to 50 μm.

The density of the porous foil is generally in a range from 0.1 to 0.6 g/cm³, preferably 0.2 to 0.5 g/cm³. If the foil is to be used as the separator in double layer capacitors, the foil has a Gurley value of <200 s. The bubble point of the foil should not exceed 350 nm, and should preferably be in the range from 50 to 300 nm, and the average pore diameter should be in the range from 50 to 100 nm, preferably in the range from 60-80 nm.

The present invention further relates to a method for producing the porous foil. According to this method, the porous foil is produced according to the flat film extrusion or coextrusion process, which is already known on its own merits. In the course of this process, the procedure is such that the mixture of propylene homopolymer and/or propylene block copolymer and β-nucleating agent, together with other optionally added polymers in the respective layer, is/are mixed together, fused in an extruder and, optionally together and simultaneously, extruded or coextruded through a flat nozzle onto a drawing-off roller, on which the single- or multilayer melt film solidifies and cools, forming the β-crystallites. The cooling temperatures and cooling times are selected in such manner that the highest possible fraction of β-crystalline polypropylene is generated in the prefilm. In general, this temperature of the drawing-off roller or rollers is 60 to 140° C., preferably 80 to 130° C. The dwell time at this temperature may vary and should be at least 20 to 300 s, preferably 30 to 100 s. The prefilm obtained thereby generally contains a fraction of β-crystallites from 40-95%, preferably 50-85%.

This prefilm with a high fraction of β-crystalline polypropylene is then stretched biaxially in such manner that the stretching causes the β-crystallites to be transformed into α-crystalline polypropylene and to form a network-like porous structure. The biaxial stretching (orientation) will generally be carried out in sequential steps, wherein the stretching is preferably carried out lengthwise first (in the direction of the machine) and then transversely (perpendicularly to the direction of the machine).

For stretching in the longitudinal direction, the cooled prefilm is first passed over one or more heating rollers, which warm the foil to the required temperature. In general, this temperature is lower than 140° C., preferably 70 to 120° C. Longitudinal stretching is then generally carried out using to rollers running at different speeds corresponding to the intended stretching ratio. In this context, the longitudinal stretching ratio is in a range from 2:1 to 6:1, preferably 3:1 to 5:1. In order to avoid excessive orientation in the longitudinal direction, the width neck-in ratio is kept low during longitudinal stretching, for example by setting a relatively narrow stretch gap. The length of the stretch gap is generally 3 to 100 mm, preferably 5 to 50 mm. Optionally, fixing elements such as spreaders may help to keep the neck-in ratio low. The neck-in ratio should be less than 10%, preferably 0.5-8%, particularly 1-5%.

After this longitudinal stretching, the foil is then cooled again by passing over a correspondingly temperature-controlled roller. Then it is heated again in the "heating fields" to the transverse stretching temperature, which is generally at a temperature from 120-145° C. This is followed by transverse stretching using a corresponding tenter frame, wherein the transverse stretching ratio is in a range from 2:1 to 9:1, preferably 3:1-8:1. In order to achieve the high porosities according to the invention, transverse stretching is carried out at a moderate to slow transverse stretching speed from >0 to 40%/s, preferably in a range from 0.5 to 30%/s, particularly 1 to 15%/s. Surprisingly, the slow transverse stretching results in higher porosity and permeability and also improved running reliability of the foil. In theory, the stretching speed may be varied via the advance speed itself or via the length of the transverse tenter frame. The faster (or slower) the product is conveyed during the production of the foil (advance speed), the faster (or slower) is the transverse stretching speed, with a given stretching factor in each case. Alternatively, the transverse stretching may be carried out over a longer section, that is to say on a longer tenter frame, in order to reduced the transverse stretching speed.

After the final stretching step, usually transverse stretching, a surface of the foil may optionally be subjected to one of the known corona, plasma or flame treatment methods. Finally, a thermosetting process (heat treatment) may be performed in which the foil is passed over rollers or an air heater box for example at a temperature from 110 to 150° C., preferably from 125 to 145° C. for about 5 to 500 s, preferably 10 to 300 s. Optionally, the foil is directed in converging manner immediately before or during the thermosetting, wherein the degree of convergence is preferably 5-25%, particularly 8 to 20%. Convergence is understood to mean a slight approach of the sides of the transverse stretching frame, so that the maximum width of the frame at the end of the transverse stretching process is greater than the width at the end of the thermosetting stage. Of course the same applies for the width of the foil web. The degree of narrowing of the transverse stretching frame is expressed as convergence, which is calculated from the maximum width of the transverse stretching frame $B_{max}$ and the final width of the foil $B_{Foil}$ according to the following formula:

$$\text{Convergence}[\%]=100\times(B_{max}-B_{Foil})/B_{max}$$

Finally, the foil is wound up on a winding device in the usual way.

In the known sequential methods, in which longitudinal and transverse stretching are carried out consecutively in a single process, it is not only the transverse stretching speed that depends on the speed of advance. The drawing-off speed and cooling rate also vary according to the speed of advance. Therefore, these parameters cannot be selected independently of each other. It follows that—under otherwise identical conditions—a slower advance speed not only reduces the transverse stretching speed, but also the cooling and drawing-off rate of the prefilm. This can, but does not necessarily represent an additional problem.

In a further embodiment of the method according to the invention, it is therefore advantageous to divide the method for producing the sequentially stretched foil into two separate processes, that is to say a first process that comprises all process steps up to and including the cooling after longitudinal stretching, hereafter referred to as the longitudinal stretching process, and a second process that comprises all process steps after the longitudinal stretching process, hereafter referred to as the transverse stretching process. As a two-stage method, this embodiment of the method according to the invention makes it possible to select the advance speed of the first process, and therewith the conditions thereof, particularly the cooling and drawing-off speeds as well as the longitudinal stretching conditions, independently of the transverse stretching speed. Accordingly, in the second, transverse stretching process, the transverse stretching speed may be slowed at will, for example by reducing the advance speed or by extending the tenter frame, without exercising any negative effects on the formation of the β-crystallites or the longitudinal stretching conditions. This method variant is implemented by carrying out the longitudinal stretching process as described in the preceding and then initially winding up this longitudinally stretched foil after it has cooled down. This longitudinally stretched foil is then used in the second, transverse stretching process, that is to say all process steps that take place after the longitudinally stretched foil has cooled down are included in this second process as described in the preceding. This now makes it possible to select the optimum transverse stretching speed without reference to the other part of the process.

The advance speeds of the longitudinal stretching process or the transverse stretching process or the sequential process referred to in the preceding are understood to refer respectively to the speed, for example in m/min., at which the foil is advanced during final winding up. Depending on the prevailing conditions, an advance speed during the transverse stretching process that is faster than that of the longitudinal stretching process may be just as advantageous as a slower advance speed.

The process conditions for the method according to the invention for producing a porous foil differ from the process conditions that are usually observed for the production of a biaxially oriented foil. In order to achieve high porosity and permeability, both the cooling conditions while the prefilm is solidifying and the temperatures and factors employed during stretching are critical. First, a large fraction of β-crystallites must be obtained in the prefilm by correspondingly slow cooling, that is to say at relatively high temperatures. In the subsequent longitudinal stretching step, the β-crystals are transformed into the alpha-modification, as a result of which flaws in the form of microcracks are formed. In order to ensure that these flaws are present in sufficient quantities and of the correct shape, longitudinal stretching must take place at relatively low temperatures. During transverse stretching, these flaws are enlarged to form pores, so that the characteristic network structure of these porous foils is created.

These temperatures, which are low compared with conventional boPP processes, particularly with regard to the longitudinal stretching, necessitate high stretching forces, which not only introduce a high level of orientation into the polymer matrix but also increase the risk of tearing. The greater the desired degree of porosity, the lower the selected temperatures must be during stretching, which in turn means that the stretching factors must be higher. Accordingly, as the desired degree of porosity and permeability in the foil increases, so the process becomes more critical. Accordingly, it is not possible to increase the porosity indefinitely by implementing ever higher stretching factors or continuously lowering the stretching temperature. In particular, the lower longitudinal stretching temperature seriously impacts the running reliability of the foil, and results in an undesirably more pronounced tendency to split. Therefore, porosity cannot be improved further by using longitudinal stretching temperatures below for example 70° C.

In the context of the present invention, it was found that, surprisingly, it is possible to influence the porosity and permeability of the foil additionally via the stretching speed during transverse stretching. Slow transverse stretching increases porosity and permeability further, without resulting in more frequent tearing or other malfunctions during the production process. The foil exhibits a previously unattainable combination of high porosity and permeability, mechanical strength, good running reliability during the manufacturing process, and low tendency to longitudinal splitting.

It is thus possible to provide a foil that by virtue of its high permeabilities is suitable for use in DLCs and at the same time satisfies the requirements with regard to mechanical strengths, particularly low tendency to split. The porous foil thus exhibits substantial advantages of paper separators or fleeces.

The foil may also be used advantageously in other applications in which very high permeabilities are required or would have advantageous effects. For example as a high-porosity separator in batteries, particularly lithium batteries that are subject to high output requirements.

The following measuring methods were used in order to characterize the raw materials and the foils:

Melt Flow Index

The melt flow index of the propylene polymers was measured according to DIN 53 735 under a load of 2.16 kg and at 230° C.

Melting Point

For the purposes of the present invention, the melting point is the maximum of the DSC curve. In order to determine the melting point, a DSC curve is recorded with a heating and cooling rate of 10K/min in the range from 20 to 200° C. To determine the melting point, the second heating curve after cooling in the range from 20 to 200° C. at a rate of 10K/min was analysed in the usual manner.

β-Content of the Prefilm

The β-content of the prefilm is also determined using a DSC measurement, which is carried out on the prefilm as follows: the prefilm is first heated to 220° C. at a heating rate of 10K/min in the DSC and melted, and then cooled again. The degree of crystallinity $K_{\beta,DSC}$ is determined from the first heating curve as a ratio of the melting enthalpies of the β-crystalline phase phase ($H_\beta$) to the sum of the melting enthalpies of the β- and α-crystalline phases ($H_\beta+H_\alpha$).

$$K_{\beta,DSC}[\%]=100\times H_\beta/(H_\beta+H_\alpha)$$

Density

The density is determined in accordance with DIN 53 479, method A.

Bubble Point:

The bubble point was measured in accordance with ASTM F316.

Porosity

As the porosity, the reduction in density ($\rho_{Foil}-\rho_{pp}$) of the foil compared with the density of the pure polypropylene $\rho_{pp}$ is calculated as follows:

$$\text{Porosity}[\%]=100\times(\rho_{pp}-\rho_{Foil})/\rho_{pp}$$

Permeability (Gurley Value)

The permeability of the foils was measured with the Gurley Tester 4110 in accordance with ASTM D 726-58. In this process, the time (in sec) required by 100 cm$^3$ air to pass through the foil surface area of 1 inch$^2$ (6.452 cm$^2$) is measured. In this context, the pressure differential across the foil corresponds to the pressure of a 12.4 cm high water column. The time required then corresponds to the Gurley value.

Neck-In Ratio:

The neck-in ratio indicates the change in width of the foil during longitudinal stretching. In this case, $B_0$ represents the width of the foil before, and $B_1$ represents the width of the foil after longitudinal stretching. The longitudinal direction is the direction of the machine, accordingly, the transverse direction is defined as the direction perpendicular to the direction of the machine. The difference between the measured widths as a ratio of the original width $B_0$ multiplied by 100 is then expressed in a percentage as the neck-in ratio.

$$\text{Neck-in ratio} B[\%]=[(B_0-B_1/B_0]*100[\%]$$

The invention will now be explained with reference to the following examples.

EXAMPLE 1

1a: Longitudinal Stretching Process

After the extrusion process, a single-layer prefilm was extruded from a flat sheet die at an extrusion temperature from 240 to 250° C. respectively. This prefilm was first drawn off and cooled on a cooling roller. Then, the prefilm was heated to the temperature for longitudinal stretching and stretched longitudinally over rollers running at different speeds. At this point, the length of the stretching gap is about 30 mm. The width of the foil was reduced by about 5% following the longitudinal stretching. Then the foil is cooled by passing it over cooling rollers. The cooled longitudinally stretched foil was then wound up.

1b: Transverse Stretching Process

The wound, longitudinally stretched foil was then stretched transversely as follows. The longitudinally stretched foil is unwound and passed over rollers into the heating spring of the tenter frame, heated to the transverse stretching temperature and oriented in the transverse direction. This transverse orientation is followed by thermosetting, in which the foil is advanced in converging manner. Finally, the foil is wound up. The foil had the following composition:

Approximately 80% by weight high-isotactic propylene homopolymerisate (PP) with $^{13}$C-NMR isotacticity of 97% and an n-heptane soluble fraction of 2.5% by weight (relative to 100% PP) and an melting point of 165° C.; and a melt flow index of 2.5 g/10 min at 230° C. and 2.16 kg load (DIN 53 735)

and approximately 20% by weight propylene-ethylene block copolymerisate with an ethylene fraction of 5% by weight relative to the block copolymer and an MFI (230° C. and 2.16 kg) of 6 g/10 min and a melting point (DSC) of 165° C. were used with 0.04% by weight Ca-pimelate as the β-nucleating agent.

The foil also contained standard small quantities of stabilizers and neutralizing agents in both layers.

In detail, the following conditions and temperatures were selected for the production of foil:

1a: Longitudinal Stretching Process:
Extrusion:
Extrusion temperature 235° C.
Drawing Off:
Temperature of drawing-off roller: 125° C.,
Drawing-off speed: 4 m/min
Longitudinal Stretching:
Temperature of preheating rollers: 90° C.
Temperature of stretching roller: 90° C.
Longitudinal stretching factor: 4.5
Temperature of cooling roller: 90° C.:
Dwell time on cooling roller: 40 s
Advance Speed
when winding up 18 m/min
1b Transverse Stretching Process
Transverse Stretching:
Temperature of heating fields: 135° C.
Temperature of tentering fields: 135° C.
Transverse stretching factor: 5
Stretching speed: 7.5%/s
Thermosetting:
Temperature: 140° C.
Convergence: 15%
Dwell time in thermosetting field: 20 s The porous foil thus produced was approximately 25 μm thick. The foil had a density of 0.31 g/cm$^3$ and had a uniform white-opaque appearance with a low Gurley value of 205 s.

EXAMPLE 2

A foil was produced as described in Example 1. Compared with Example 1, only the tentering speed during transverse stretching was changed. The longitudinally stretched foil was stretched in the transverse direction at a speed of 6%/s at 135° C. Otherwise, the composition of the foil was unchanged and the other process conditions were retained.

The porous foil thus produced was approximately 27 μm thick. The foil had a density of 0.29 g/cm$^3$ and had a uniform white-opaque appearance and an even lower Gurley value than Example 1, 161 s.

EXAMPLE 3

A foil was produced as described in Example 1. Compared with Example 1, only the tentering speed during transverse stretching was changed. The longitudinally stretched foil was stretched in the transverse direction at a speed of 4.5%/s at 135° C. Otherwise, the composition of the foil was unchanged and the other process conditions were retained.

The porous foil thus produced was approximately 28 μm thick. The foil had a density of 0.28 g/cm$^3$ and had a uniform white-opaque appearance and a Gurley value of 130 s.

EXAMPLE 4

A foil was produced as described in Example 1. Compared with Example 1, only the tentering speed during transverse stretching was changed. The longitudinally stretched foil was stretched in the transverse direction at a speed of 2.5%/s at 135° C. Otherwise, the composition of the foil was unchanged and the other process conditions were retained.

The porous foil thus produced was approximately 29 μm thick. The foil had a density of 0.26 g/cm$^3$ and had a uniform white-opaque appearance and a Gurley value of 60 s, considerably lower than that of Example 1.

EXAMPLE 5

A foil was produced as described in Example 1. Compared with Example 1, only the tentering speed during transverse stretching was changed. The longitudinally stretched foil was stretched in the transverse direction at a speed of 1%/s at 135° C. Otherwise, the composition of the foil was unchanged and the other process conditions were retained.

The porous foil thus produced was approximately 30 μm thick. The foil had a density of 0.25 g/cm$^3$ and had a uniform white opaque appearance and a Gurley value of 40 s, considerably lower than that of Example 1.

COMPARISON EXAMPLE 1

A foil was produced as described in Example 1. Compared with Example 1, only the length of the stretching gap during longitudinal stretching was changed. The stretching gap was opened to a length of 150 mm. The width of the longitudinally stretched foil was reduced by 12% by the neck-in ratio during longitudinal stretching.

The foil thus produced had approximately the same density and Gurley value as the foil according to Example 1. However, the foil demonstrated limited running reliability to its tendency to split. During production of the foil, tearing occurred frequently in the transverse stretching phase, with the result that the foil is uneconomical to produce.

COMPARISON EXAMPLE 2

A foil was produced as described in Example 1. Compared with Example 1, only the length of the stretching gap during longitudinal stretching was changed. The stretching gap was opened to a length of 300 mm. The width of the longitudinally stretched foil was reduced by 22% by the neck-in ratio during longitudinal stretching.

The foil thus produced had approximately the same density and Gurley value as the foil according to Example 1. However, the foil demonstrated limited running reliability to its tendency to split. Tearing occurred frequently in the transverse stretching phase, during production of the foil.

COMPARISON EXAMPLE 3

A foil was produced as described in Example 1. Compared with Example 1, only the stretching speed during transverse stretching was changed. The longitudinally stretched foil was stretched transversely at an increased speed of 50%/s at 135° C. Otherwise, the composition of the foil was unchanged and the other process conditions were retained.

A foil with low porosity of 50% and a Gurley value of 1250 s was obtained.

COMPARISON EXAMPLE 4

A foil was produced as described in Example 1. Compared with Example 1, only the stretching speed during transverse stretching was changed. The longitudinally stretched foil was stretched transversely at an increased speed of 100%/s at 135° C. Otherwise, the composition of the foil was unchanged and the other process conditions were retained.

A foil with low porosity of 40% and an inadequate Gurley value of 2800 s was obtained.

The properties of examples 1-5 and comparison examples 1-4 are summarised in the following table. This reveals that only the foils of examples 1-5, which were produced according to the method of the invention have the desired properties such as high porosity and very low Gurley value while retaining good running reliability throughout the production process.

TABLE

| | Longitudinal stretching Stretching gap [mm] | Neck-in ratio Longitudinal stretching [%] | Transverse stretching speed [%/s] | Running reliability | Porosity [%] | Gurley [s] |
|---|---|---|---|---|---|---|
| Ex. 1 | 10 | 5 | 7.5 | Good | 66 | 205 |
| Ex. 2 | 10 | 5 | 6 | Good | 68 | 161 |
| Ex. 3 | 10 | 5 | 4.5 | Good | 69 | 130 |
| Ex. 4 | 10 | 5 | 2.5 | Good | 72 | 60 |
| Ex. 5 | 10 | 5 | 1 | Good | 73 | 40 |
| Comp. ex. 1 | 150 | 12 | 7.5 | Poor | 65 | 203 |
| Comp. ex. 2 | 300 | 22 | 7.5 | Very poor | 66 | 190 |
| Comp. ex. 3 | 10 | 5 | 50 | Moderate | 50 | 1250 |
| Comp. ex. 4 | 10 | 5 | 100 | Moderate* | 40 | 2800 |

*higher lengthwise orientation causes more frequent tears during transverse stretching

The invention claimed is:

1. A biaxially oriented, single layer or multilayer porous film, porosity of which is generated by transformation of β-crystalline polypropylene during stretching of the film, which comprises at least one porous layer, which layer contains at least one propylene polymer and β-nucleating agent, wherein the film has a Gurley value of <250 s and wherein when the propylene polymer is a propylene block polymer, the propylene block polymer has a melting range that begins at over 120° C.

2. The film according to claim 1, wherein the Gurley value of the film is 10 to 200 Gurley.

3. The film according to claim 1, wherein the at least one propylene polymer is a propylene homopolymer and/or a propylene block copolymer.

4. The film according to claim 1, wherein the β-nucleating agent is a calcium salt of pimelic acid and/or of suberic acid or a nanoscale iron oxide.

5. The film according to claim 1, wherein the film contains propylene homopolymer and propylene block copolymer.

6. The film according to claim 1, wherein the film contains 50 to 85% by weight propylene homopolymer, 15 to 50% by weight propylene block copolymer and 50 to 10,100 ppm β-nucleating agent.

7. The film according to claim 1, wherein the density of the film is in a range from 0.1 to 0.5 g/cm$^3$.

8. The film according to claim 1, wherein the film has a thickness from 10 to 100 μm.

9. A method for producing a single layer or multilayer porous polypropylene film in which in a first longitudinal stretching process propylene polymer and β-nucleating agents are melted in an extruder and extruded through a flat nozzle onto a take-off roller, on which the melt film cools down and solidifies, forming β-crystallites, and this film is then stretched longitudinally, cooled and wound up, and in a second, transverse stretching process, this longitudinally stretched, wound up film is unwound, heated to a transverse stretching temperature and stretched in the transverse direction, wherein the advance speed of the longitudinal stretching process is greater or less than the advance speed of the transverse stretching process.

10. The method according to claim 9, wherein the advance speed of the transverse stretching process is selected such that the transverse stretching takes place at a stretching speed of less than 40%/sec.

11. A separator which comprises the film according to claim 1.

12. A separator which comprises the film produced according to the method according as claimed in claim 9.

13. A double layer capacitor containing the film according to claim 1.

14. A double layer capacitor containing the film produced according the method according to claim 9.

15. The film according to claim 1, wherein the film obtained in a first longitudinal stretching process propylene polymer and β-nucleating agents are melted in an extruder and extruded through a flat nozzle onto a take-off roller, on which the melt film cools down and solidifies, forming β-crystallites, and this film is then stretched longitudinally, cooled and wound up, and in a second, transverse stretching process, this longitudinally stretched, wound up film is unwound, heated to a transverse stretching temperature and stretched in the transverse direction, wherein the advance speed of the longitudinal stretching process is greater or less than the advance speed of the transverse stretching process.

16. The film according to claim 15, wherein the advance speed of the transverse stretching process is selected such that the transverse stretching takes place at a stretching speed of less than 40%/sec.

17. The film according to claim 1, wherein the propylene block polymer has a melting range from 125 to 140° C.

* * * * *